United States Patent
Dobbelaere et al.

[11] Patent Number: 6,105,084
[45] Date of Patent: Aug. 15, 2000

[54] PRIORITY-BASED ACCESS CONTROL ARRANGEMENT BY ASSIGNING FIRST AND SECOND OWN PRIORITIES TO EACH OF UNITS

[75] Inventors: Philippe Guillaume Dobbelaere, Wilrijk; Geert Arthur Edith Van Wonterghem, Eeklo, both of Belgium

[73] Assignee: Alcatel, Paris, France

[21] Appl. No.: 09/022,177

[22] Filed: Feb. 11, 1998

Related U.S. Application Data

[60] Provisional application No. 60/052,158, Jul. 10, 1997.

[30] Foreign Application Priority Data

Feb. 11, 1997 [EP] European Pat. Off. .............. 97400303

[51] Int. Cl.$^7$ .................................................. G06F 13/36
[52] U.S. Cl. .............................. 710/40; 710/36; 710/107; 710/240
[58] Field of Search ................................ 710/36, 37, 40, 710/8, 107, 110, 113, 240

[56] References Cited

U.S. PATENT DOCUMENTS

| | | | |
|---|---|---|---|
| 4,326,250 | 4/1982 | McCullough | 710/242 |
| 4,334,288 | 6/1982 | Booher | 710/121 |
| 4,402,040 | 8/1983 | Evett | 710/119 |
| 4,511,959 | 4/1985 | Nicolas et al. | 710/120 |
| 4,628,447 | 12/1986 | Cartret et al. | 710/242 |
| 5,081,578 | 1/1992 | Davis | 710/119 |
| 5,193,197 | 3/1993 | Thacker | 710/123 |
| 5,265,215 | 11/1993 | Fukuda et al. | 710/123 |
| 5,321,818 | 6/1994 | Wendling et al. | 710/110 |
| 5,434,984 | 7/1995 | Deloddere et al. | 710/108 |
| 5,459,840 | 10/1995 | Isfeld et al. | 710/129 |
| 5,463,741 | 10/1995 | Levenstein | 710/119 |
| 5,528,767 | 6/1996 | Chen | 710/113 |
| 5,546,587 | 8/1996 | Silver | 710/242 |
| 5,787,264 | 7/1998 | Christiansen et al. | 710/113 |

FOREIGN PATENT DOCUMENTS 0562222  9/1993  European Pat. Off. .

*Primary Examiner*—Thomas C. Lee
*Assistant Examiner*—Harold Kim
*Attorney, Agent, or Firm*—Ware, Fressola, Van Der Sluys & Adolphson LLP

[57] ABSTRACT

An access control method to control access to a communication channel of a plurality of units coupled to it, each unit having a first and a second own priority assigned to it, includes a first step of comparing and withdrawing units, based on the first own priorities of said units, and for these units that have not withdrawn after the first step, this first step is repeated but using the second own priorities of these remaining units. A method to control access to a communication channel interconnecting a multitude of pluralities of units coupled to it, includes the mentioned steps for a single plurality for at least one plurality amongst said multitude.

17 Claims, 3 Drawing Sheets

6,105,084

PRIORITY-BASED ACCESS CONTROL ARRANGEMENT BY ASSIGNING FIRST AND SECOND OWN PRIORITIES TO EACH OF UNITS

CLAIM OF PRIORITY UNDER 35 USC §119

This application claims priority under 35 USC §119(e) from U.S. Provisional Application S/N 60/052,158, filed Jul. 10, 1997 and under 35 USC §119(a) from European Application 97400303.0 filed Feb. 11, 1997.

BACKGROUND OF THE INVENTION

1. Technical Field

The present invention relates to an access control method and an access control arrangement to control access to a communication channel with a plurality of units coupled to it.

2. Discussion of Related Art

Such a method and arrangement are already known in the art, e.g. from the European Patent Application, publication number 0562 222 A1, "Access control arrangement". Therein, the access of a plurality of interconnected units to a communication channel is controlled by a mechanism whereby each of the interconnected units receives from a preceding unit an access request word comprising a plurality of successive request channels to which priorities are assigned, and whereby each unit writes its own priority in the corresponding request channel. The request word is then transmitted to a following unit. Before writing its own priority in the request channel, each unit compares its own priority with the priorities of the preceding units, this comparison resulting in an withdrawal of this unit from the communication channel in case its own priority is lower than the priorities of preceding units, and resulting in an inhibition of access of these preceding units having a lower priority than the unit under consideration. When after a predetermined time interval the unit under consideration is itself not inhibited by any of the following units, access of this unit to the communication channel is granted. This mechanism is thus not only based on a priority, but also on the physical position of the unit with respect to a control unit which has a reference position, thereby determining the meaning of "preceding" or "following". Indeed, in case several units have identical priorities, the unit which is located at the largest distance from the control unit, gains the access. This means that after a first priority phase whereby each unit compares priorities and possibly puts its own priority in the request channel, a positional phase grants the access to the communication channel as a function of the physical position of the unit with respect to the controller. In the described prior art arrangement this latter mechanism is realized by a control line carrying the access flag signal signal UAF, which interconnects the units in a daisy-chain connection. This access flag signal is determined individually per unit, based on the access flag signal generated in the preceding unit. The daisy-chain configuration however implies that, in case a unit is removed from the communication channel, extra control logic circuitry is to be provided to maintain the functioning of this control line for generating the appropriate access flag signal UAF per unit, based on the signal generated in a preceding unit, For an embodiment of the arrangement whereby all individual units are coupled to a backpanel, this proper functioning of the access mechanism therefore requires extra logic circuitry to be added to the backpanel. This however enhances the failure rate of the complete arrangement, whereby the latter configuration also seriously enlarges the mean time to repair the arrangement in case of malfunctioning of this logic circuitry, this fact representing a major drawback.

A second major drawback of the prior art arrangement is the limit in units that can be interconnected to the communication channel. Indeed with the current signal and clock levels at the time of the invention, a maximum of 32 interconnected units is a physical limit for the prior art configuration.

SUMMARY OF INVENTION

An object of the present invention is to provide a method and arrangement of the above known type but which does not require extra logic circuitry for guaranteeing proper functioning of the mechanism in case one or more units are extracted or inserted from or to the communication channel, and which allows to couple much more than 32 units to the communication channel.

According to a first aspect of the invention, an access control method to control access to a communication channel of a plurality of units coupled to it, each of said units having a first own priority assigned to it, said method including a step of comparing said first own priorities of said units with each other, whereby a unit withdraws from said communication channel if said first own priority of said unit relates to said first own priorities of said units in accordance with a first predetermined comparison criterion is characterized in that each unit of said plurality has a second own priority assigned to it, in that for these units that have not withdrawn from said communication channel after said first-mentioned step, said method includes a further step of comparing said second own priorities of said these units with each other, whereby a specific unit of said these units, withdrawn from said communication channel if said second own priority of said specific unit relates to said second own priorities of said these units in accordance with a second predetermined comparison criterion, said method including a final step of granting access to said communication channel to a remaining unit which has not withdrawn from said communication channel.

According to a second aspect of the invention, an access control arrangement to control access to a communication channel of a plurality of units coupled to it, and included in the arrangement, each of said units of said plurality having a first own priority assigned to it, said arrangement including an access request interface adapted to receive from each of said units said first own priority, and to determine therefrom a first access request word in accordance with a first predetermined access criterion, each of said units of said plurality including a comparing means which is adapted to receive from said access request interface said first access request word, and to perform a comparison between said first own priority of each of said units and said first access request word, thereby generating a first control signal for a data buffer included in each of said units, said first control signal being such that said data buffer is inhibited form transmitting data to said communication channel if the result of said comparison complies with a first predetermined comparison criterion is characterized in that each of said units of said plurality has a second own priority assigned to it, in that said access request interface is further adapted to receive from each of said units said second own priority, and to determine therefrom a second access request word in accordance with a second predetermined access criterion, each of said comparing means included in each of said units of said plurality being further adapted to receive from said access request interface said second access request word, and to perform a distinct comparison between said second own priority of each of said units and said second access request word, thereby further updating said first control signal such that said data buffer is inhibited form transmitting data to said communication channel if the result of said distinct comparison complies with a second predetermined comparison criterion.

In this way, by replacing the position-based access phase by a second priority phase, whereby the units that have not withdrawn after the first priority phase now compare their second priorities in an analog way as they did for their first priorities, inserting or removing units from the communication channel no longer requires extra control logic to be put on the backpanel, since for both analogue mechanisms the units are coupled in a wired-or configuration, as was already mentioned in the prior art document, and which is not interrupted by the removal or insertion of one or more units. The absence of this extra control logic on the backpanel thereby improves the failure rate of the whole arrangement, and seriously improves the mean time to repair the complete arrangement in case of malfunctioning.

Moreover, as will be described in another paragraph, this mechanism also allows to extend the amount of interconnected units, for instance by allowing several backpanels of 32 interconnected units to be interconnected to the communication channel. This problem in fact relates to an access method and arrangement to control access to a communication channel interconnecting a multitude of pluralities of units, which will be described in a further paragraph.

An additional characteristic feature of the present invention is that said first, respectively said second own priorities are represented by first, respectively second, own priority words, and that said steps of comparing and withdrawing are performed on the values of at least one bit from said first, respectively said second, own priority words.

This additional characteristic feature is further explained with respect to the first aspect of the present invention by the fact that said first, respectively said second, own priorities are represented by first, respectively second, own priority words, in that said step, respectively said further step, of comparing that withdrawing, with respect to said first, respectively said second, own priorities, is performed by a bit comparison step, on at least one bit from said first, respectively said second, own priority words, in a first, respectively a second, predetermined sequence, whereby said unit, respectively said specific unit, withdraws from said communication channel in case the result of said bit comparison step on said at least one bit from said first, respectively said second, own priority word of said unit, respectively said specific unit, is in accordance with a first, respectively a second, predetermined bit comparison criterion, related to said first, respectively said second predetermined comparison criterion, and whereby, in case the result of said bit comparison step on said at least one bit from said first, respectively said second, own priority word, is not in accordance with said first, respectively said second, bit comparison criterion, said bit comparison step is repeated on the values of at least one other distinct bit from said first, respectively said second own priority words, until all bits of said first, respectively said second own priority word are compared.

It is explained further with respect to the second aspect of the invention, in that each of said units further includes extraction means adapted to extract, upon control of a second control signal, and according to a predetermined first, respectively second sequence, at least one bit from a first, respectively second, own priority word related to said first, respectively said second sequence, at least one bit from a first, respectively second, own priority word related to said first, respectively said second, own priority of each of said units, each of said extraction means being further adapted to transmit aid at least one bit from said first, respectively said second own priority word to said access request interface and to said comparing means included in said each unit, and to generate a third control signal upon detecting that all bits of said first own priority word and all bits of said second own priority word have been extracted, said access request interface being further adapted to determined, from said at least one bit of said first, respectively said second, own priority word transmitted by each of said extraction means, at least one corresponding bit of said first, respectively said second, access request word according to a first, respectively a second, predetermined bit access criterion related to said first, respectively said second, predetermined access criterion, in that each of said comparing means is further adapted to receive from said access request interface said at least one corresponding bit of said first, respectively said second, access request word, and to compare these respectively with said at least one bit of said first, respectively said second, own priority word, received from said extraction means, and to generate therefrom, and from said third control signal, in accordance with a first, respectively said second, predetermined comparison criterion, the value of said first control signal to said data buffer included in each of said units, and the value of said second control signal to said extraction means.

In this way, by sequentially comparing bits from respective priority words related to the respective priorities of the units, whereby units can already withdraw after having compared at least one bit, not only a very simple arrangement is provided, but also an arrangement with reduced power consumption. Indeed, these units that withdraw after having compared only a few bits, may temporary turn off their extraction and comparing means, this presenting a selective power-down functionality of the complete arrangement.

The present invention further relates to a plurality access control method to control access to a communication channel interconnecting a multitude of pluralities of units coupled to it.

Thus, according to a third aspect of the present invention, a plurality access control method to control access to a communication channel interconnecting a multitude of pluralities of units coupled to it is characterized in that for at least one plurality among said multitude, the method according to the first aspect of the invention is performed whereby said first, respectively said second predetermined comparison criterion is related to said at least one plurality, in that for each plurality among said multitude a first plurality access request word related to said each plurality is determined, according to a first predetermined plurality access criterion related to said each plurality, in that said each plurality of said multitude has a plurality priority assigned to it, in that said method further includes a next step of comparing a multitude of informations with each other, each of said informations being related to each of said pluralities and based on said first plurality access request word related to said each plurality and on said plurality priority, whereby all units of a specific plurality withdraw from said communication channel if said information related to said specific plurality relates to said multitude of informations, in accordance with a third predetermined criterion, said method including a final step of granting access to said communication channel to a unit which has not withdrawn from said communication channel after execution of all previously-mentioned steps.

Similarly, according to a fourth aspect of the present invention, a plurality access control arrangement to control access to a communication channel interconnecting a multitude of pluralities of units coupled to it and included in said plurality access control arrangement is characterized in that said arrangement includes a set of access request interfaces, each access request interface among said set being related to a corresponding plurality among said multitude of pluralities and being adapted to generate a first plurality access request word related to said each corresponding plurality, in accordance with a first predetermined plurality access criterion related to said corresponding plurality, in that said at least one access request interface and at least one corresponding plurality of units are included in at least one access control arrangement according to the second aspect of the invention, said first, respectively said second predetermined access criterion and said first, respectively said second predetermined comparison criterion being related to said at least one corresponding plurality, in that each of said pluralities among said multitude is assigned a plurality priority, in that said arrangement further includes a backpanel access request interface, coupled to said each access request interface among said set, and adapted to receive from said each access request interface, said first plurality access request word related to said each corresponding plurality, and to inhibit therefrom, and from all said plurality priorities, all units form at least one specific plurality from said communication channel, in accordance with a third predetermined criterion.

In this way the previously described principle is used for at least one plurality, among the multitude of pluralities, whereby, for this at least one plurality, one unit is retained, based on the aforementioned two-priorities mechanism. Secondly, a similar mechanism is used, but now on the multitude-level, whereby information related to each plurality is compared with similar information from all pluralities. For each plurality, this information depends on one hand on a first plurality access request word related to this plurality, and on the other hand on the priority of this plurality. The latter mechanism leads to a possible withdrawal of one or more pluralities, meaning that all units of these pluralities are withdrawn from the communication channel, based on a third predetermined criterion. In a final step access to the communication channel is granted to one remaining unit of a remaining plurality.

Another characteristic feature of the present invention is that said plurality priority is based on the physical position of said plurality with respect to a reference plurality. Thus, in further accord with both the third and fourth aspects of the invention, said plurality priority assigned to said each plurality among said multitude is determined by the position of said each plurality with respect to a reference plurality from said multitude of pluralities, said third predetermined criterion thereby relating to the position of said each plurality with respect to said reference plurality.

In this way, the distance of each plurality, with respect to a reference plurality can be used for determining respective priorities of each plurality. By further choosing a simple relationship between this physical distance and the priority, e.g. a proportional or inversely proportional relationship, said method is executed in the fastest way possible, taking into account the physical limitations due to signal propagation delays, as will be explained more into detail in a further paragraph.

Still a further characteristic feature of the present invention is that said information per plurality is compared in several steps, per plurality. In more detail, according to the third aspect of the invention, the next step of comparing said multitude of informations is performed sequentially, by per plurality comparing said first plurality access request word related to said plurality with an updated first plurality access request word related to a preceding plurality, whereby all units from said preceding plurality are inhibited from accessing said communication channel if said first plurality access request word of said plurality relates to said updated first plurality access request word of said preceding plurality in accordance with said third predetermined criterion, and whereby an updated first plurality access request word related to said plurality is generated according to a fourth predetermined access criterion related to said third predetermined criterion.

The step of comparing the further information may include for these pluralities of which all units are not inhibited from accessing said communication channel, a following step of inhibiting all units of said these pluralities except one plurality of these pluralities which is positioned at a larger distance from said reference plurality than an other plurality among said these pluralities.

According further to said fourth aspect of the present invention, each of said access request interfaces among said set is associated to an enabling unit included in said backpanel access request interface and adapted to receive from said each access request interface said first plurality access request word related to said corresponding plurality, from a preceding enabling unit an updated first plurality access request word related to said preceding plurality, and to generate therefrom an updated first plurality access request word related to said corresponding plurality in accordance with a fourth predetermined access criterion related to said third predetermined criterion, and the value of a local control signal according to a fourth predetermined criterion related to said third predetermined criterion.

Furthermore, each of said access request interfaces among said set is further associated to a plurality selection means included in said backpanel access request interface and adapted to receive from a following plurality selection means an inhibiting signal, from said enabling unit associated to said each access request interface, said local control signal, and to determined therefrom an inhibiting signal and a plurality grant signal, in accordance with a fifth predetermined criterion related to said third predetermined criterion, and to transmit said plurality grant signal to all units of said corresponding plurality.

Still further, for said plurality included in said at least one access control arrangement, each of said units included therein further includes a combining means, adapted to receive said plurality grant signal from said plurality selection means associated to said access request interface of said at least one access control arrangement and said first control signal from said comparing means included in each of said units, to determine therefrom an access control signal for transmission to said data buffer, included in each of said units, being adapted to transit data to said communication channel, upon control of said access control signal.

In this way, again taken into account variable signal delays due to varying cabling lengths interconnecting the units of one plurality, a very simple embodiment of the arrangement for fast performing the method is provided.

Yet further in accord with the fourth aspect of the invention, for said at least one access control arrangement, each of said units included therein is further realized according to the second aspect of the invention, in that each of said enabling units is further adapted to receive from said associated access request interface at least one corresponding bit of said first plurality access request word related to said corresponding plurality, and from said preceding enabling unit at least one corresponding bit of said updated first plurality access request word, for generating at least one corresponding bit of said updated first plurality access request word related to said corresponding plurality and said local control signal.

In this way, as was already mentioned in a previous paragraph during the explanation of the mechanism for one single plurality of units, by allowing individual units and pluralities to withdraw from the communication channel, after having compared only a few bits of their respective first plurality access request words, the power consumption of the complete plurality access control arrangement is reduced.

BRIEF DESCRIPTION OF THE DRAWING

The above mentioned and other objects and features of the invention will become more apparent and the invention itself will be best understood by referring to the following description of an embodiment taken in conjunction with the accompanying drawing wherein.

DETAILED DESCRIPTION OF PREFERRED EMBODIMENTS

The access control method, as well as the arrangement realizing this method of the present invention, is, in one embodiment, used in the access part of a full service network architecture, where different line interface modules, each constituting an interface between the network and the user, are coupled to one communication channel, in this embodiment serving to bidirectionally transmit ATM-cells. The access control method of the present invention is used for access arbitration in the upstream direction, i.e. the direction from the user to the network central office or switch.

Figure 2:
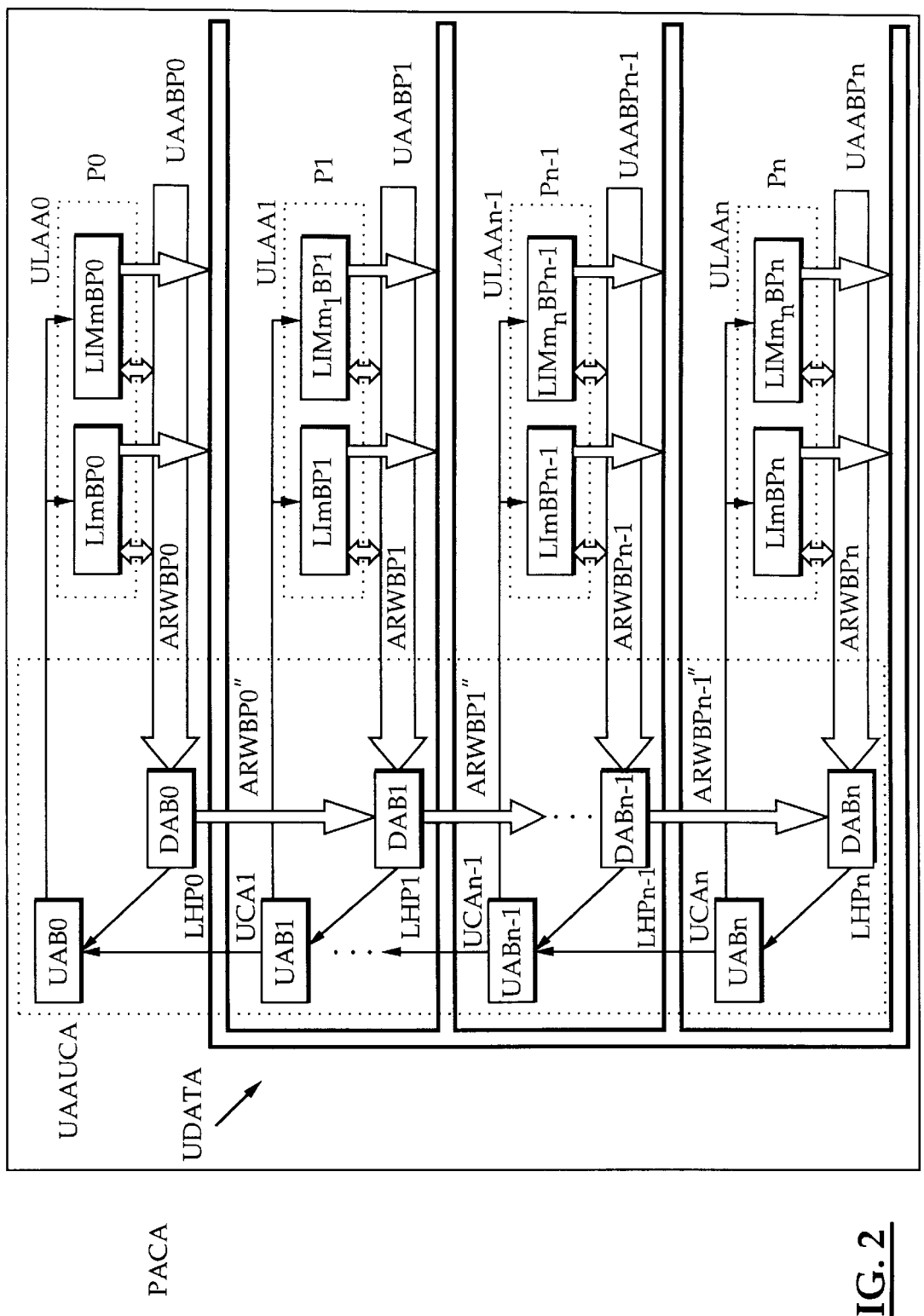
FIG. 2 is a schematic representation of a plurality access control arrangement for controlling access to a communication channel interconnecting a multitude of pluralities of units coupled to it, according to the invention, FIG. 3 gives a more detailed representation of one plurality of FIG. 2.

In this embodiment, the line interface modules are grouped in so-called line termination boards, whereby several line termination boards are grouped in a so-called access adapter rack. These are all coupled together for forming the access adapter. This configuration is represented in FIG. 2 where each access adapter rack is represented as one plurality of units, from plurality P0 to plurality Pn, whereby the line interface modules are represented by LIM0BP0 to $LIMm_0BP0$ for the plurality denoted P0, LIM0BP1 to $LIMm_1BP1$ for plurality denoted P1, LIM0BPn−1 to $LIMm_{n-1}BPn-1$ for plurality Pn−1 and LIM0BPn to $LIMm_nBPn$ for plurality Pn, and whereby the common communication channel to which all units are coupled is represented by UDATA. The complete arrangement is denoted PACA. For simplicity reasons grouping of the individual line interface modules into the line termination boards is not shown on this figure, since this grouping has no influence on the access control method of the present invention. The subject access mechanism is suited for granting access, in the upstream direction, thus for data transmitted from the unit towards the communication channel. Therefore the couplings between each unit and the communication channel UDATA are represented in FIG. 2 as unidirectional couplings. The mechanism for granting access to one unit out of this multitude of pluralities of units to the communication channel UDATA in fact consists of two major procedures: a first procedure for selecting one unit from one plurality of units, and a second procedure for selecting one plurality from a multitude of pluralities. Finally both selections are combined together for granting access to one single selected unit of one single selected plurality. The first procedure, describing the mechanism for granting access to one unit from a single plurality of interconnected units will first be described, followed, in a later paragraph, by the description of the second procedure and of the complete method as well as the complete plurality access control arrangement.

Figure 1:
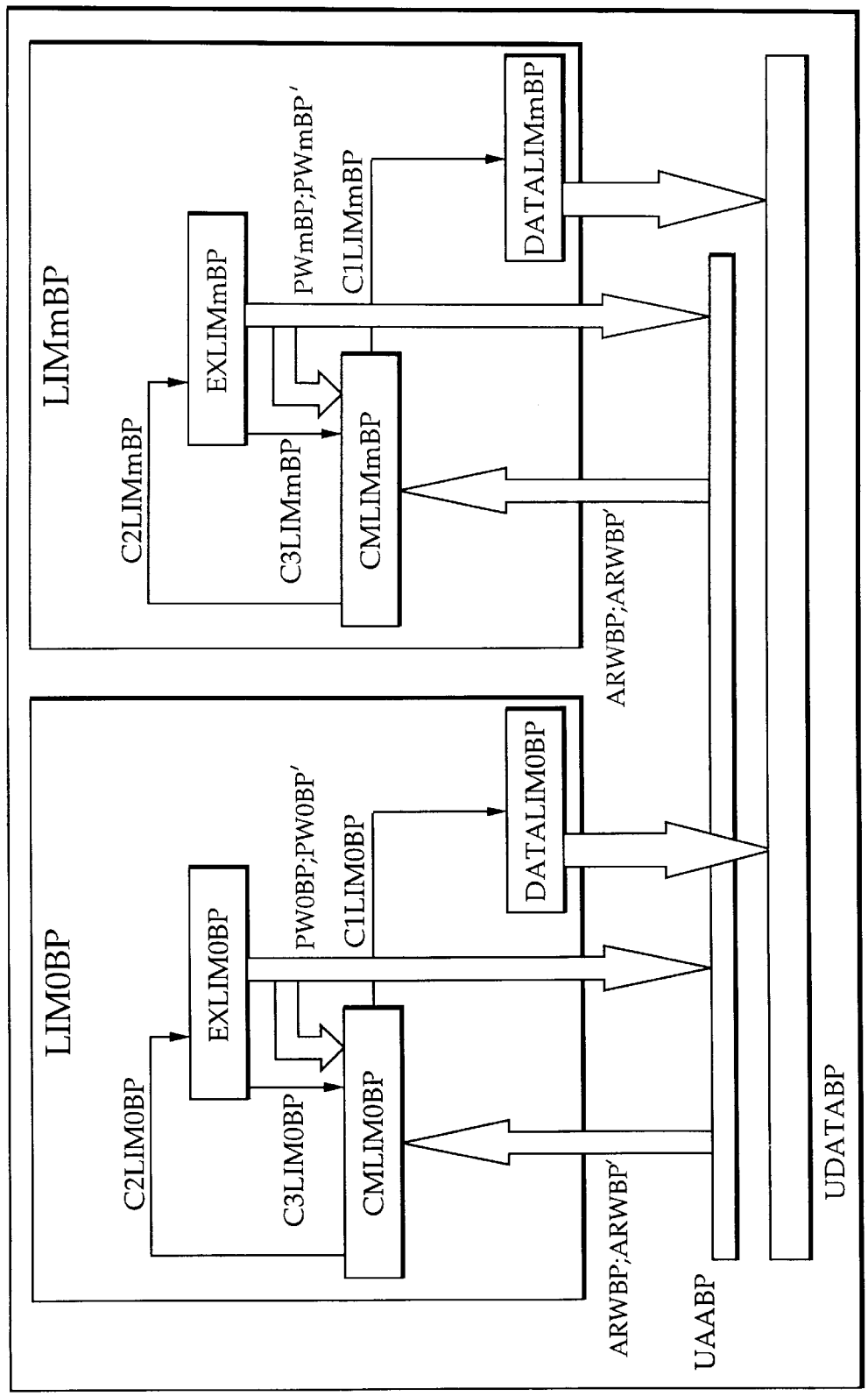
FIG. 1 is a schematic representation of an access control arrangement for controlling access to a communication channel of a plurality of units coupled to it, according to the invention.

For the first part, reference to FIG. 1 is made, showing the interconnected units, denoted LIM0BP to LIMmBP of one single plurality, which are all included in the access control arrangement ACA. These units are coupled to one communication channel, in FIG. 1 represented as UDATABP, and also included in the access control arrangement ACA. Each of these units has a first own priority, as well as a second own priority assigned to it. The access control method for one single plurality of units consists of a first step of comparing all first own priorities of all units of this plurality with each other, whereby one or more units consequently may withdraw from the communication channel UDATABP, if the first own priority of this one or these units relates to all first own priorities of all units in accordance with a first predetermined comparison criterion. In the access adapter embodiment, this first predetermined comparison criterion for withdrawal of a unit being that the first own priority of this unit has to be smaller than the maximum of all first own priorities of all units of the plurality. If only one unit has the maximum first priority amongst all units of the plurality, all units, except the one having the maximum first priority, will thus withdraw from the communication channel. However, in the special case whereby all units should have an identical first own priority, no unit withdraws. Therefore, in general, this first step is followed by a further step whereby all units that have not yet withdrawn from the communication channel, after execution of this first step, now compare their second own priorities with each other, whereby again a specific unit withdraws from the communication channel if its second own priority relates to all second own priorities of these remaining units, in accordance with a second predetermined comparison criterion. This second predetermined comparison criterion may be the same as the first predetermined comparison criterion. In this case, in order to end up with one single unit getting access to the communication channel, all second own priorities have to be distinct from each other. In the access adapter embodiment, each unit has a unique slotidentification number, which serves as its second own priority, thereby unambiguously guaranteeing access to one unit, on one hand having the maximum of all first own priorities and, in case this maximum first own priority is shared by more units, on the other hand also being assigned the highest slotidentification number. However, other embodiments of the access control arrangement exist in which the second predetermined comparison criterion is different from the first predetermined comparison criterion, thereby possibly allowing identical second own priorities, provided that the combined result of both first and second comparing steps leads to one unique unit not to withdraw from the communication channel and consequently getting the access.

In the access adapter embodiment of the arrangement both comparison steps are performed sequentially on distinct bits from a first , respectively a second, own priority word, denoted PW0BP to PWmBP and PW0BP' to PWmBP' respectively on FIG. 1, and which is related to the first, respectively second own priority of each unit. In this embodiment this relationship is realised by the two-complements binary coding of the first priority value into the corresponding first priority word, and by straightforward binary coding of the slotidentification number, constituting the second own priority of each unit, into the second own priority word. In this embodiment the coding or relationship of the first own priority into the first own priority word is thus different from the coding or relationship between the second own priority into the second own priority word. However, it is evident that a lot of other possibilities are realisable in variant embodiments.

In the access adapter embodiment consecutive bits of these words are successively compared, starting with the most significant bits of the first own priority words, and ending with the least significant bits of the second own priority words. However, again other embodiments may be realised wherein the bits of the respective priority words are compared in another sequence, or wherein more than one bit of the respective priority words are compared in one step. For proper functioning of the arrangement, it is evident that all first, respectively second, priority words of all units have the same number of bits. The bits to be compared in this predetermined sequence are, per step, provided by an extraction means, included within each unit and denoted by EXLIM0BP to EXLIMmBP in FIG. 1, and delivered to a comparing means, also included within each unit, and denoted CMLIM0BP to CMLIMmBP in FIG. 1. In the access adapter embodiment all extraction means of all units more or less simultaneously extract the bits located at the same bit positions of the first, resp second, own priority words of each unit, which they then provide to an access request interface, included in the arrangement and in FIG. 1 denoted as UAABP. In the access adapter embodiment of the arrangement this access request interface UAABP is realised by a local line to which all units LIM0BP to LIMmBP are coupled in a wired-or configuration, and more specifically in an open-drain configuration. This latter configuration has the advantage that one unit from the plurality of interconnected units may pull this line to a specific voltage level (either high or low, depending on the specific type of circuitry and devices used), in response to a particular value of one bit of the priority word. This specific feature allows, in this embodiment, for an almost immediate determination of the corresponding bit of a first, respectively second, access request word of this plurality, denoted ARWBP and ARWBP' resp., the specific voltage level at the access request interface line thus relating to this corresponding bit of the access request word. All units con consequently in parallel sense the voltage at this line, for comparing this with their own particular bit value of their first, respectively second, own priority word. This comparison is performed in the previously mentioned comparing means, CMLIM0BP to CMLIMmBP, all receiving from the access request interface UAABP the corresponding bit of the first, respectively second, access request word, ARWBP, resp. ARWBP', for comparing this with the bit of the first, respectively second own priority word. From this comparison, each comparing means generates a first control signal for already possibly inhibiting the corresponding unit from the communication channel, in accordance with a first, resp. second, predetermined bit comparison criterion. This first control signal is denoted CMLIM0BP to CMLIMmBP for the respective units on FIG. 1, and serves as an input control signal for a data buffer included in the units, denoted DATALIM0BP to DATALIMmBP on FIG. 1. Depending on its specific signal value, this first control signal inhibits or allows the corresponding data buffer to transmit data to the databus UDATABP. Each comparing means also generates a second control signal denoted C2LIM0BP to C2LIMmBP, serving as an input signal for the corresponding extraction means, and informing this extraction means whether the next bit or bits of the priority bit word have to be extracted or not.

Both first and second own priority words are compared consecutively. In one embodiment of the access adapter the first own priority word of each unit is represented by a 5-bit word, whereby the highest priority, being 15, is, as already mentioned represented by the bitword 00000, and whereby the lowest priority, being 0, is represented by bitword 11111. The circuitry of the extraction means coupled to the access request interface is such that a bit 0 of the first own priority word will force the access request interface line low, the latter voltage thereby being coded as a "0" for the corresponding bit of the access request word. The combination of this circuitry as well as this voltage level coding at the access request interface thereby constituting the first predetermined bit access criterion. When the bit comparison is started, a unit with a most significant bit 0 of its first own priority word, will then force the access request interface low, another unit with a most significant bit 1 of its first own priority word, will sense the "0" at the access request interface line, compare this with its own "1", and withdraws based on the first predetermined bit comparison criterion stating that, if the respective bit of the priority word is higher than the corresponding bit of the access request word, the unit has to withdraw. It is clear that this first predetermined bit comparison criterion is still related to the first predetermined comparison criterion stating that a unit with a lower priority than the maximum of all priorities of all interconnected units, has to withdraw from the communication channel, the relationship originating from the coding of the first own priority into the first own priority word, and from the coding of the voltage at the access request interface line into the corresponding bit of the access request word. In a similar way, in this embodiment the second own priority word of a unit is the binary representation of its unique slot identification, but in this case the extraction means is such that a "1" bit of this second priority word will now force the access request interface UAABP low. This low voltage value at the access request interface now corresponds with a "1" value of the bit of the second access request word, the second bit access criterion used for determining the corresponding bit of the second access request word, thus being different from the first bit access criterion for determining the corresponding bit of the first access request word. If now two competing units, a first one with a higher slotidentification, a second one with a lower slotidentification are performing the successive bitcomparison step on their successive bits of their second own priority words, a unit withdrawing hereby from the communication channel if a bit of its second own priority word is lower than the corresponding bit of the access request word, the first one will gain the access. Thus the second predetermined bit comparison criterion stating that a unit with a lower bit value than the corresponding bit of the access request word, has to withdraw is again related to the second predetermined criterion stating that a unit with a lower second priority (in this case a lower slot identification number), has to withdraw. The relationship being again determined by the coding of the priority into the priority word, and the specific circuitry used for relating a respective bit value of the priority, resp access request word, to a specific voltage level at the access request interface. At the end of both consecutive bit comparison steps, the unit with the highest first priority is retained, and, if there were more units with the same highest first priority, one of them having the highest slotidentification is getting the access.

The indication of the fad that the final bit or bits from the second priority word are extracted and transmitted, is supplied by each extraction means as a third control signal, denoted C3LIM0BP to C3LIMmBP, and transmitted to each comparing means CMLIM0BP to CMLIMmBP.

It is obvious that the transmission of the data to the communication channel UDATABP, as well as the extraction and transmission of the individual bits of the several priority and access request words between the units and the access request interface UAABP, is further controlled by other timing signals, which are however not relevant to the invention and which will therefore not be further described here. A person skilled in the art is able to generate from this functional description the appropriate timing control signals, as well as physical and electrical implementations of the different mentioned blocks in order to realise a properly functioning arrangement.

FIG. 2 depicts a plurality access control arrangement PACA for controlling access to a multitude of pluralities of units, as was already mentioned in a previous paragraph. In FIG. 2 the pluralities are represented by P0,P1, . . . , Pn−1,Pn, and the communication channel by UDATA. The plurality access control mechanism for granting access to one out of this multitude of plurality of units, denoted LIM0BP0/LIMm$_0$BP0,LIM0BP1/LIMm$_1$, BP1, . . . , LIM0BPn−1/LlMm$_{n-1}$BPn−1, LIM0BPn/LIMm$_n$BPn is partly based on the access control mechanism previously described for the single plurality case. As a matter of fact, the steps as mentioned for the single plurality embodiment, are now performed separately on at least one plurality of the multitude. Furthermore, per plurality, a first plurality access request word related to this plurality, and denoted by ARWBP0,ARWBP1, . . . , ARWBPn−1, ARWBPn for the respective pluralities P0,P1, . . . , Pn−1,Pn, is generated by an access request interface related to each of these respective pluralities and respectively denoted UAABP0, UAABP1, . . . , UAABPn−1, UAABPn on FIG. 2. These first plurality access request words related to each plurality may be determined according to the previously described method for the single plurality case, but this is only necessary for one plurality amongst the multitude.

The access adapter embodiment of the plurality access control arrangement PACA is using the previously described method for withdrawing units and generating a first plurality access request word, for all its pluralities. Moreover, in this embodiment, units of all pluralities are withdrawn based on the same predetermined first and second comparison criteria, whereas the same predetermined plurality access criteria are used for realising the first plurality access request words related to each plurality. However, other embodiments of the plurality access control arrangement exist, whereby the predetermined first and second comparison criteria for withdrawing one or more units from the communication channel are different from one plurality to another, as well as the predetermined plurality access criteria for creating the first plurality access request words related to each plurality. Even embodiments exist wherein only one plurality of the plurality access control arrangement is realised in accordance to the described arrangement for the single plurality case, and whereby for all other units of all other pluralities a different access control mechanism is used. It is however mandatory for a plurality access control arrangement according to the present invention that for each plurality a first plurality access request word related to this plurality is provided on a corresponding access request interface. This is needed since the plurality access control method includes a next step of comparing these first plurality access request words ARWBP0, ARWBP1, . . . , ARWBPn−1,ARWBPn of all pluralities, with each other, for further selecting one plurality out of the multitude. Pluralities are either selected or withdrawn from the communication channel based on information related to these pluralities, this information for each plurality consisting of the first plurality access request word of each plurality, and of a plurality priority, assigned to each plurality. A plurality then withdraws from the communication channel, meaning that all units of that plurality withdraw from the communication channel, in accordance with a third predetermined criterion. Again this criterion may be different from the predetermined comparison criteria used for individually withdrawing units of one plurality.

These first plurality access request words ARWBP0 to ARWBPn are, per plurality, provided by each corresponding access request interface UAABP0 to UAABPn, to a backpanel access request interface, in FIG. 2 denoted UAAUCA. In principle, again the same procedure and arrangement for withdrawing a plurality from the multitude, based on the plurality priorities and based on the first plurality access request words per plurality, as these applicable for the single plurality case, could be used. However, due to timing signal constraints, related to the wiring length of the access request interfaces, which may vary from plurality to plurality, not all first plurality access request words are formed in the same time slot or period, which therefore complicates the use of a wired-or configuration on the multitude level for fast withdrawing pluralities on this backpanel or multitude level. To overcome such problems, and still provide a very fast plurality access control method, in most embodiments, the individual plurality priorities are made dependent on the physical position of each individual plurality with respect to a reference plurality. In FIG. 2, plurality P0 is chosen as this reference plurality. The third predetermined criterion, on the basis of which a plurality withdraws from the communication channel, is by this choice also dependent on the position of each plurality with respect to this reference plurality. This dependency of the plurality priority on the physical position now allows to use a daisy-chain configuration. As mentioned in a previous paragraph, such a daisy-chain configuration has inherent drawbacks on the single plurality level in the backpanel embodiment, related to the extra control logic needed to overcome malfunctioning in case a unit should be inserted to or extracted from this backpanel. However, on the multitude level, this extra control logic can be put on a separate so-called extender board, to be provided on each separate backpanel or rack, in the access adapter embodiment. In this specific embodiment, such extender boards are already present for generating the appropriate timing signals from rack to rack for guaranteeing a proper functioning of the arrangement. The extra control logic to be put on the extender board for preventing the daisy-chain configuration on the access adapter level from malfunctioning in case for instance a complete rack should fall out, of course enlarges the failure rate of this extender board, but only to a small extent if compared to the complete failure rate of the extender board. Moreover such a board can be easily replaced, in contrast to a complete rack or backpanel in the case of the single backpanel situation of the prior art. The mean time to repair is in this case thus not significantly increased. In addition, compared to the prior art situation, the total amount of control logic to be added is also reduced by a factor equal to the amount of units that can be connected to one backpanel or are included in one plurality.

In the daisy-chain configuration of the backpanel access request interface the selected reference plurality is thus considered as a reference for determining the distance of each plurality with respect to this reference plurality. In addition, this daisy-chain has to be followed in a certain direction, from a starting plurality towards an end plurality. This starting plurality may be the reference plurality, whereas this end plurality may be the most distant plurality with respect to the reference plurality, but this is not necessary. This initially followed direction further defines the concepts of "preceding" and "following" plurality. In FIG. 2, plurality P0 is the reference plurality and the direction initially to be followed in the daisy chain is from plurality P0 to plurality P1, etc., to plurality Pn. The remainder of this description will consider the topology with plurality P0 being the reference plurality for determining the relative distance, and also being the starting plurality for initially passing through the daisy-chain. However, in another embodiment, the most distant plurality with respect to the reference one, may be selected as the starting plurality for passing through the daisy-chain.

In the daisy-chain configuration each first plurality access request word related to each plurality is now compared with an updated first plurality access request word related to a preceding plurality, this procedure starting in the chosen initial direction, from the plurality at the closest distance from the starting plurality, in the embodiment of FIG. 2 being plurality P1. To initialise this procedure an updated first plurality access request word, denoted ARWBP0" is generated for the reference plurality P0 as the original first plurality access request word ARWBP0 of this reference plurality P0. In order to perform the sequential comparison from plurality to plurality, the backpanel access request interface UAAUCA includes a multitude of enabling units, denoted DAB0,DAB1, . . . , DABn-1 to DABn, whereby DAB0 is a reference enabling unit, related to the reference plurality P0 in the embodiment of FIG. 2, and whereby each other enabling unit DAB1 to DABn is related to a corresponding plurality P1 to Pn. The reference enabling unit DAB0 thus receives from the reference plurality access request interface UAABP0 the first plurality access request word ARWBP0 related to this reference plurality, and transmits this word as the updated first plurality access request word ARWBP0" related to the reference plurality, to the following enabling unit, DAB1. The reference enabling unit DAB0 further generates a predetermined value of a local control signal, denoted LHP0. The function of this local control signal will be described in a further paragraph.

Enabling unit DAB1 receives from its preceding enabling unit, DAB0, the updated first plurality access request word ARWBP0" related to the preceding plurality P0 and also receives from its associated access request interface, UAABP1, the first plurality access request word ARWBP1 related to plurality P1. Enabling unit DAB1 then determines from both received words an updated first plurality access request word, denoted ARWBP1" and related to plurality P1, in accordance with a fourth predetermined access criterion, which is itself related to the third predetermined criterion. This updated first plurality access request word ARWBP1" is then further transmitted by enabling unit DAB1 to the following enabling unit (not shown on FIG. 2), whereas at the same time DAB1 also generates a local control signal, denoted LHP1, in accordance with a fourth predetermined criterion which is itself also related to the third predetermined criterion. This local control signal LHP1 is indicative of whether the local first plurality access request word ARWBP1 was related to all preceding first plurality access request words, in this case thus only ARWBP0, in accordance with the third predetermined criterion. In general, the local control signal represents a local and temporary status of how the first plurality access request words of all pluralities in between the plurality under consideration and the starting plurality are related to each other. In the access adapter embodiment for example, where the starting plurality is the reference plurality and where the third predetermined criterion determines that pluralities have to withdraw from the communication channel if their first plurality access request words are lower than the maximum first plurality access request word amongst all pluralities of the multitude, in each enabling unit the updated first plurality access request word of the preceding plurality is compared with the first plurality access request word of the plurality under consideration. The updated first plurality access request word of this plurality under consideration is thereby generated as the maximum of both compared words, this being the fourth predetermined access criterion, whereas the value of the generated local control signal LHP is indicative of whether the first plurality access request word of the plurality under consideration is either lower, or not lower than the updated one of the preceding plurality. This presenting the fourth predetermined criterion, which is also related to the third predetermined criterion, as was this fourth predetermined access criterion.

The procedure for generating updated first plurality access request words for each plurality and generating the corresponding local control signals, is performed in each enabling unit, until finally enabling unit DABn has generated its corresponding local control signal LHPn. This most distant enabling unit DABn is in fact the first enabling unit to know whether its corresponding first plurality access request word ARWBPn was related to all first plurality access request words, ARWBP0 to ARWBPn, in accordance with the third predetermined criterion. This knowledge, carried by the local control signal LHPn, now serves as input for generating a plurality grant signal, denoted ULAAn for this most distant plurality Pn, the value of which determines whether this most distant plurality gains access to the communication channel UDATA or not. This plurality grant signal ULAAn is generated in a most distant plurality selection means, denoted UABn, based on the corresponding local control signal LHPn. In case however another plurality, for instance plurality Pn-1 should also have the maximum first plurality access request word, one of both pluralities has to be selected, based again on the third predetermined criterion, which further determines the access grant of a plurality in function of the relative distance of this plurality with respect to the reference plurality. In the access adapter embodiment, this third predetermined criterion states that, in case more pluralities share the maximum first plurality access request words, one of them, located at the largest distance from the reference plurality, gains access. This means that in this embodiment, in the configuration of FIG. 2, plurality Pn gains the access, whereas plurality Pn-1 has to be inhibited from the communication channel. Therefore the most distant plurality selection means UABn, apart from generating a plurality grant signal ULAAn for its corresponding plurality Pn, also generates an inhibiting signal, denoted UCAn and being indicative of whether the access has already been granted to a following plurality or not. Remark that the term "following" still has to be understood with respect to the starting plurality and the initial direction for passing through the daisy-chain. In this most distant plurality selection means UABn, the signal UCAn is directly determined by the local control signal LHPn. However this information from the most distant plurality Pn has to ripple back to all preceding pluralities, in the opposite direction, in FIG. 2 being the direction from the most distant plurality Pn towards the reference plurality P0. The backpanel access control interface UAAUCA therefore further includes, n−1 other plurality selection means, denoted UABn−1, . . . , UAB1, UAB0 on FIG. 2, each one associated to a respective plurality Pn−1, . . . , P1,P0, and receiving from a following plurality selection means UABn to UAB1 an inhibiting signal, denoted UCAn to UCA1, and from a corresponding enabling unit, DABn−1, . . . , DAB1, DAB0, the corresponding local control signal LHPn−1, . . . , LHP1,LHP0. Each of these plurality selection means UABn−1 to UAB0, generates from both signals the appropriate value of a corresponding plurality grant signal, denoted ULAAn−1 to ULAA0, as well as the corresponding value of an inhibiting signal UCAn−1 to UCA0. Since for the reference plurality P0, such an inhibiting signal is not of any functional use, it is not shown in FIG. 2, and has in principle not to be generated.

From the above description, it is evident that the plurality selection in the daisy-chain configuration occurs in two phases, a first phase whereby all first plurality access request words are sequentially compared in the respective enabling units following the initial chosen direction from a starting plurality towards an end plurality, and using the first mechanism previously described. In a second phase, the inhibiting signals generated in the plurality selection means ripple back from the end plurality towards the starting plurality using the second mechanism previously described. Only when the locally generated LHP signals are combined with the rippled back inhibiting UCA signals, the value of the locally generated plurality grant signals ULAA are meaningful.

It further needs to be remarked that the daisy-chain configuration of the backpanel access request interface UAAUCA, further implies that the positional information with respect to the third predetermined criterion, can only be used in two ways: either pluralities at the largest distance from the reference plurality are selected, or either pluralities at the shortest distance from the reference plurality are selected. In the described access adapter embodiment the third predetermined criterion implied the first of both possibilities. It is however rather simple for a person skilled in the art how to generate the appropriate signals and embodiments for the second case, as well as for the case another starting direction should have be chosen to pass through the daisy-chain.

After thus having selected one unit per plurality, and one plurality, both selections need to be combined. Therefore the plurality grant signals, denoted ULAA0, ULAA1, . . . , ULAAn−1, ULAAn, are to be combined with the already locally, per plurality generated control signals for controlling access of one unit. For the at least one plurality, in FIGS. 2 and 3 being the plurality P1, of the plurality access control arrangement PACA, which was included in an access control arrangement ACA for controlling access of a plurality of units to a communication channel as is previously described, each unit therefore includes a combining means, denoted GLIM0BP1 to GLIMm$_1$BP1. This combining means serves to combine the already locally, in the comparing means CMLIM0BP1 to CMLIMm$_1$BP1, generated first control signals, C1LIM0BP1 to C2LIMm$_1$BP1, with the plurality grant signal ULAA1. The access control signal resulting from this, denoted ALIM0BP1 to ALIMm$_1$BP1, is then the final control signal for allowing the data buffer of the respective units, denoted by DATALIM0BP1 to DATALIMm$_1$BP1, for transmitting its data to the communication channel.

Figure 3:
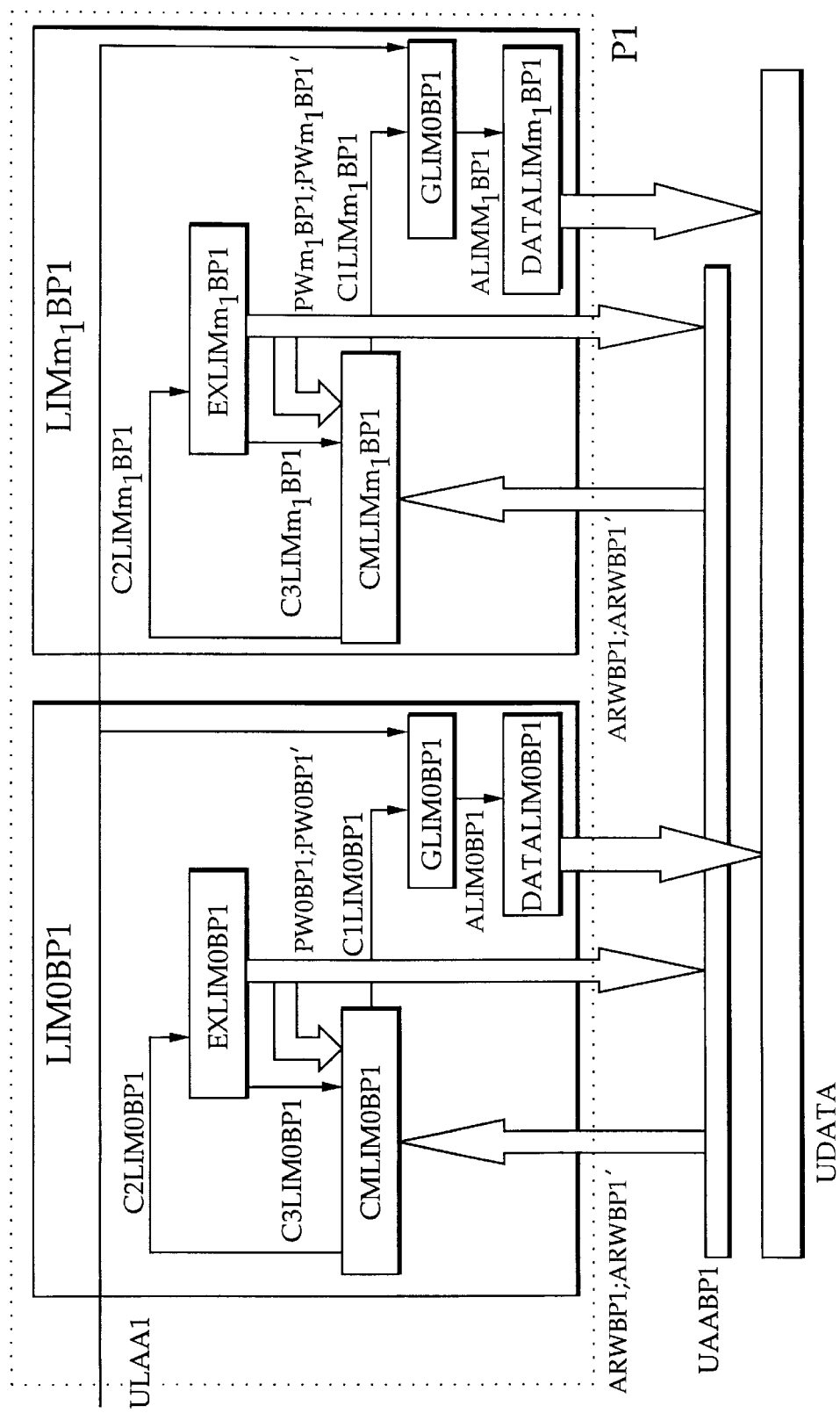

In the access adapter embodiment of the plurality access control arrangement such a combining means is present in all units. Furthermore in this embodiment, first and second priorities are compared by performing a bit comparison on the values of at least one bit of the first, respectively second priority words, as was described in a previous paragraph for the single plurality arrangement. For each plurality, the units included therein are further built as is shown in FIG. 3 for one plurality P1. Each unit LIM0BP1 to LIMm$_1$BP1 therefore includes an extraction means, denoted EXLIM0BP1 to EXLIMm$_1$BP1, for extracting at least one bit from a first, resp a second own priority word of each unit, and resp. denoted PW0BP1 to PWm$_1$BP1, and PW0BP1' to PWm$_1$BP1', in a specific sequence. The operation of each extraction means is controlled by a second control signal denoted C2LIM0BP1 to C2LIMm$_1$BP1, and also generated by the already mentioned comparing means CMLIM0BP1 to CMLIMm$_1$BP1. Each extraction means further generates a third control signal, denoted C3LIM0BP1 to C3LIMm$_1$BP1, as is already described in a previous paragraph for the single plurality arrangement. Each comparing means CMLIM0BP1 to CMLIMm$_1$BP1 further compared the extracted bits from the first, resp second own priority words with the corresponding bits of the resp first plurality access request word, ARWBP1 and a second plurality access request word, denoted ARWBP1' related to its corresponding plurality, in FIG. 3 being plurality P1. Both plurality access request words, being generated by the access request interface UAABP1.

Such embodiments also allow for sequentially determining the successive bits of the updated first access request words by the respective enabling units DAB0 to DABn, as soon as they are receiving at least one bit of their corresponding access request word ARWBP0 to ARWBPn. Depending on these access request words, the locally generated LHP control signals can therefore, in an early stage after having compared one or a few bits of the access request words, already cause the inhibiting and the plurality grant signals to be such that all units of some pluralities withdraw in an early stage of the complete method, thereby lowering the power consumption of the embodiment of the arrangement.

Again, it needs to be emphasised that in this case also circuitry is needed for generating the appropriate timing signals for adequately controlling the proper functioning of the arrangement. In the access adapter embodiment the circuitry for generating the proper timing and initialisation signals of the arrangement and the different pluralities are incorporated in the already mentioned extender boards. In this embodiment the method is initiated by a common signal, which represents a timing reference for the complete method, starting at the reference plurality, and rippling through the following pluralities, after which it ripples back from the most distant to the reference plurality, taken into account clock regeneration due to cabling delays. In this embodiment, in each separate plurality a separate plurality reference signal is generated from this common signal, taking into account a predetermined delay due to cabling length variations, etc. The cumulating of all individual plurality delays is also taken into account when starting rippling back the UCAn signal from the most distant plurality towards the reference plurality. However, other embodiments for realising the appropriate timings are possible. Since these signals are not really relevant to the invention, these will not be further described, nor the circuitry for generating them. A person skilled in the art is able for revising this circuitry as well as physical or electrical embodiments of the mentioned blocks of the invention.

It is further worth mentioning that all first and second priorities of all units included in arrangements according to the invention, are dynamically adaptable. Also the different predetermined criteria may be adopted, although not dynamically, by means of for instance software control. The complete arrangement thus being very flexible and versatile.

While the principles of the invention have been described above in connection with specific apparatus, it is to be clearly understood that this description is made only by way of example and not as a limitation on the scope of the invention.

We claim:

1. Access control method to control access to a communication channel (UDATABP) of a plurality of units (LIM0BP/LIMmBP) coupled to it, each of said units having a first own priority assigned to it, said method including a step of comparing said first own priorities of said units with each other, whereby a unit withdraws from said communication channel if said first own priority of said unit relates to said first own priorities of said units in accordance with a first predetermined comparison criterion, characterised in that said method is to control access in a direction from users to a network central office or switch, that said channel is for bidirectional communication between said users and said network central office or switch, that each unit of said plurality has a second own priority assigned to it, in that for these units that have not withdrawn from said communication channel after said first mentioned step, said method includes a further step of comparing said second own priorities of said these units with each other, whereby a specific unit of said these units, withdraws from said communication channel if said second own priority of said specific unit relates to said second own priorities of said these units in accordance with a second predetermined comparison criterion, said method including a final step of granting access to said communication channel to a remaining unit which has not withdrawn from said communication channel, wherein said first, respectively said second, own priorities are represented by first, respectively second, own priority words, in that said step, respectively said further step, of comparing and withdrawing, with respect to said first, respectively said second, own priorities, is performed by a bit comparison step, on at least one bit from said first, respectively said second, own priority words, in a first, respectively a second, predetermined sequence, whereby said unit, respectively said specific unit, withdraws from said communication channel in case the result of said bit comparison step on said at least one bit from said first, respectively said second, own priority word of said unit, respectively said specific unit, is in accordance with a first, respectively a second, predetermined bit comparison criterion, related to said first, respectively said second predetermined comparison criterion, and whereby, in case the result of said bit comparison step on said at least one bit from said first, respectively said second, own priority word, is not in accordance with said first, respectively said second, bit comparison criterion, said bit comparison step is repeated on the values of at least one other distinct bit from said first, respectively said second own priority words, until all bits of said first, respectively said second own priority word are compared.

2. Access control method according to claim 1, characterized in that said first, respectively said second, own priorities of each of said units are dynamically adaptable.

3. The method of claim 1, characterized in that said control access in a direction from users to a network central office or switch is according to user priority, that said bidirectional communication between said users and said network central office or switch is via said plurality of units, and that said second own priority assigned to each unit corresponds to a user priority also assigned to said each unit.

4. Plurality access control method to control access to a communication channel (UDATA) interconnecting a multitude of pluralities (P0, P1, . . . , Pn−1, Pn) of units (LIM0BP0/LIMm$_o$BP0, LIM0BP1/LIMm$_1$BP1, . . . , LIM0BPn−1/LIMm$_{n-1}$BPn−1, LIM0BPn/LIMm$_n$BPn) coupled to it, characterized in that for at least one plurality (P1) among said multitude, the method according to claim 1 is performed, whereby said first, respectively said second predetermined comparison criterion is related to said at least one plurality (P1), in that for each plurality among said multitude a first plurality access request word related to said each plurality is determined, according to a first predetermined plurality access criterion related to said each plurality, in that said each plurality (P0, P1, . . . , Pn−1, Pn) of said multitude has a plurality priority assigned to it, in that said method further includes a next step of comparing a multitude of informations with each other, each of said informations being related to each of said pluralities and based on said first plurality access request word related to said each plurality and on said plurality priority, whereby all units of a specific plurality withdraw from said communication channel if said information related to said specific plurality relates to said multitude of informations, in accordance with a third predetermined criterion, said method including a final step of granting access to said communication channel to a unit which has not withdrawn from said communication channel after execution of all previously-mentioned steps.

5. Plurality access control method according to claim 4 characterised in that said plurality priority assigned to said each plurality amongst said multitude is determined by the position of said each plurality with respect to a reference plurality (P0) from said multitude of pluralities, said third predetermined criterion thereby relating to the position of said each plurality with respect to said reference plurality (P0).

6. Plurality access control method according to claim 5 characterised in that, said next step of comparing said multitude of informations is performed sequentially, by per plurality comparing said first plurality access request word related to said plurality with an updated first plurality access request word related to a preceding plurality, whereby all units from said preceding plurality are inhibited from accessing said communication channel if said first plurality access request word of said plurality relates to said updated first plurality access request word of said preceding plurality in accordance with said third predetermined criterion, and whereby an updated first plurality access request word related to said plurality is generated according to a fourth predetermined access criterion related to said third predetermined criterion.

7. Plurality access control method according to claim 6 characterised in that said step of comparing said information further includes, for these pluralities of which all units are not inhibited from accessing said communication channel, a following step of inhibiting all units of said these pluralities except one plurality of these pluralities which is positioned at a larger distance from said reference plurality (P0) than any other plurality amongst said these pluralities.

8. Plurality access control arrangement (PACA) according to claim 7, characterised in that said first, respectively said second, own priorities of said units are dynamically adaptable.

9. Access control arrangement (ACA) to control access to a communication channel (UDATABP) of a plurality of units (LIM0BP/LIMmBP) coupled to it, and included in the arrangement, each of said units of said plurality having a first own priority assigned to it, said arrangement including an access request interface (UAABP) adapted to receive from each of said units said first own priority, and to determine therefrom a first access request word (ARWBP) in accordance with a first predetermined access criterion, each of said units of said plurality including a comparing means (CLIM0BP/CLIMmBP) which is adapted to receive from said access request interface (UAABP) said first access request word (ARWBP), and to perform a comparison between said first own priority of each of said units and said first access request word, thereby generating a first control signal (C1LIM0BP/C1LIMmBP) for a data buffer (DATALIM0BP/DATALIMmBP) included in each of said units, said first control signal (C1LIM0BP/C1LIMmBP) being such that said data buffer is inhibited from transmitting data to said communication channel (UDATABP) if the result of said comparison complies with a first predetermined comparison criterion, characterised in that, each of said units of said plurality has a second own priority assigned to it, in that said access request interface (UAABP) is further adapted to receive from each of said units said second own priority, and to determine therefrom a second access request word (ARWBP') in accordance with a second predetermined access criterion, each of said comparing means (CMLIM0BP/CMLIMmBP) included in each of said units (LIM0BP/LIMmBP) of said plurality being further adapted to receive from said access request interface (UAABP) said second access request word (ARWBP'), and to perform a distinct comparison between said second own priority of each of said units and said second access request word, thereby further updating said first control signal (C1LIM0BP/C1LIMmBP) such that said data buffer is inhibited from transmitting data to said communication channel (UDATABP) if the result of said distinct comparison complies with a second predetermined comparison criterion.

10. Access control arrangement (ACA) according to claim 9 characterised in that each of said units (LIM0BP/LIMmBP) further includes extraction means (EXLIM0BP/EXLIMmBP) adapted to extract, upon control of a second control signal (C2LIM0BP/C2LIMmBP), and according to a predetermined first, respectively second sequence, at least one bit from a first, respectively second, own priority word (PW0BP/PWmBP;PW0BP'/PWmBP') related to said first, respectively said second, own priority of each of said units, each of said extraction means being further adapted to transmit aid at least one bit from said first, respectively said second own priority word to said access request interface (UAABP) and to said comparing means (CMLIM0BP/CMLIMmBP) included in said each unit, and to generate a third control signal (C3LIM0BP/C3LIMmBP) upon detecting that all bits of said first own priority word and all bits of said second own priority word have been extracted, said access request interface (UAABP) being further adapted to determine, from said at least one bit of said first, respectively said second, own priority word transmitted by each of said extraction means (EXLIM0BP/EXLIMmBP), at least one corresponding bit of said first, respectively said second, access request word (ARWBP;ARWBP') according to a first, resp. a second, predetermined bit access criterion related to said first, respectively said second, predetermined access criterion, in that each of said comparing means (CMLIM0BP/CMLIMmBP) is further adapted to receive from said access request interface (UAABP) said at least one corresponding bit of said first, respectively said second, access request word (ARWBP;ARWBP'), and to compare these respectively with said at least one bit of said first, respectively said second, own priority word, received from said extraction means, and to generate therefrom, and from said third control signal, in accordance with a first, respectively a second predetermined bit comparison criterion related to said first, respectively said second, predetermined comparison criterion, the value of said first control signal (C1LIM0BP/C1LIMmBP) to said data buffer (DATALIM0BP/DATALIMmBP) included in each of said units, and the value of said second control signal (C2LIM0BP/C2LIMmBP) to said extraction means (EXLIM0BP/EXLIMmBP).

11. Access control arrangement (ACA) according to claim 9, characterised in that said first, respectively said second, own priorities of each of said units are dynamically adaptable.

12. Plurality access control arrangement (PACA) to control access to a communication channel (UDATA) interconnecting a multitude of pluralities (P0,P1, . . . , Pn−1,Pn) of units (LIM0BP0/LIMm$_0$BP0,LIM0BP1/LIMn$_1$BP1, . . . , LIM0BPn−1/LIMm$_{n-1}$BPn−1,LIM0BPn/LIMm$_n$BPn) coupled to it and included in said plurality access control arrangement (PACA), characterised in that said arrangement includes a set of access request interfaces (UAABP0,UAABP1, . . . , UAAPBn−1, UAABPn), each access request interface (UAABP0, UAABP1, . . . , UAABPn−1,UAABPn) amongst said set being related to a corresponding plurality (P0,P1, . . . , Pn−1,Pn) amongst said multitude of pluralities and being adapted to generate a first plurality access request word (ARWBP0,ARWBP1 , . . . , ARWBPn−1,ARWBPn) related to said each corresponding plurality (P0,P1, . . . , Pn−1,Pn), in accordance with a first predetermined plurality access criterion related to said corresponding plurality (P0,P1, . . . , Pn−1,Pn), in that at least one access request interface (UAABP1) and at least one corresponding plurality of units (P1) are included in at least one access control arrangement according to claim 4, said first, respectively said second predetermined access criterion and said first, respectively said second predetermined comparison criterion being related to said at least one corresponding plurality (P1), in that each of said pluralities (P0,P1 , . . . , Pn−1,Pn) amongst said multitude is assigned a plurality priority, in that said arrangement further includes a backpanel access request interface (UAAUCA), coupled to said each access request interface amongst said set (UAABP0,UAABP1, . . . , UAABPn−1,UAABPn), and adopted to receive from said each access request interface (UAABP0,UAABP1, . . . , UAABPn−1, UAABPn), said first plurality access request word related to said each corresponding plurality (ARWBP0, ARWBP1, . . . ARWBPn−1,ARWBPn), and to inhibit therefrom, and from all said plurality priorities, all units from at least one specific plurality from said communication channel (UDATA), in accordance with a third predetermined criterion.

13. Plurality access control arrangement (PACA) according to claim 12 characterized in that said plurality priority assigned to said each plurality amongst said multitude is determined by the position of said each plurality with respect to a reference plurality (P0) from said multitude of pluralities, said third predetermined criterion thereby relating to the position of said each plurality with respect to said reference plurality (P0).

14. Plurality access control arrangement (PACA) according to claim 13 characterized in that each of said access request interfaces amongst said set (UAABP0,UAABP1, . . . , UAABPn−1,UAABPn) is associated to an enabling unit (DAB0,DAB1, . . . , DABn−1,DABn) included in said backpanel access request interface (UAAUCA) and adapted to receive from said each access request interface said first plurality access request word (ARWBP0,ARWBP1, . . . , ARWBPn−1, ARWBPn) related to said corresponding plurality (P0,P1, . . . , Pn−1,Pn), from a preceding enabling unit an updated first plurality access request word related to said preceding plurality, and to generate therefrom an updated first plurality access request word (ARWBP0",ARWBP1", . . . , ARWBPn−1", ARWBPn") related to said corresponding plurality (P0, P1, . . . , Pn−1,Pn) in accordance with a fourth predetermined access criterion related to said third predetermined criterion, and the value of a local control signal (LHP0,LHP1, . . . , LHPn−1,LHPn) according to a fourth predetermined criterion related to said third predetermined criterion.

15. Plurality access control arrangement (PACA) according to claim 14 characterized in that each of said access request interfaces amongst said set (UAABP0,UAABP1, . . . , UAABPn−1,UAABPn) is further associated to a plurality selection means (UAB0,UAB1, . . . , UABn−1,UABn) included in said backpanel access request interface (UAAUCA) and adapted to receive from a following plurality selection means an inhibiting signal, from said enabling unit (DAB0,DAB1, . . . , DABn−1,DABn) associated to said each access request interface, said local control signal (LHP0,LHP1, . . . , LHPn−1,LHPn), and to determine therefrom an inhibiting signal (UCA0, UCA1, . . . , UCAn−1,UCAn) and a plurality grant signal (ULAA0,ULAA1, . . . , ULAAn−1,ULAAn), in accordance with a fifth predetermined criterion related to said third predetermined criterion, and to transmit said plurality grant signal to all units of said corresponding plurality.

16. Plurality access control arrangement (PACA) according to claim 15 characterized in that for said plurality (P1) included in said at least one access control arrangement, each of said units (LIM0BP1/LIMm$_1$BP1) included therein further includes a combining means (GLIM0BP1/GLIMm$_1$BP1), adapted to receive said plurality grant signal (ULAA1) from said plurality selection means (UAB1) associated to said access request interface (UAABP1) of said at least one access control arrangement and said first control signal (C1LIM0BP1/C1LIMm$_1$BP1) from said comparing means (CMLIM0BP1/CMLIMm$_1$BP1) included in each of said units, to determine therefrom an access control signal (ALIM0BP1/ALIMm$_1$BP1) for transmission to said data buffer (DATALIM0BP1/DATALIMm$_1$BP1), included in each of said units, being adapted to transmit data to said communication channel (UDATA), upon control of said access control signal (ALIM0BP1/ALIMm$_1$BP1).

17. Plurality access control arrangement (PACA) according to claim 16, characterized in that for said at least one access control arrangement, each of said units (LIM0BP1/LIMm$_1$BP1) included therein further includes extraction means (EXLIM0BP/EXLIMmBP) adapted to extract, upon control of a second control signal (C2LIM0BP/C2LIMmBP), and according to a predetermined first, respectively second sequence, at least one bit from a first, respectively second, own priority word (PW0BP/PWmBP; PW0BP'ZPWmBP') related to said first, respectively said second, own priority of each of said units, each of said extraction means being further adapted to transmit aid at least one bit from said first, respectively said second own priority word to said access request interface (UAABP) and to said comparing means (CMLIM0BP/CMLIMmBP) included in said each unit, and to generate a third control signal (C3LIM0BP/C3LIMmBP) upon detecting that all bits of said first own priority word and all bits of said second own priority word have been extracted, said access request interface (UAABP) being further adapted to determine, from said at least one bit of said first, respectively said second, own priority word transmitted by each of said extraction means (EXLIM0BP/EXLIMmBP), at least one corresponding bit of said first, respectively said second, access request word (ARWBP; ARWBP') according to a first, respectively a second, predetermined bit access criterion related to said first, respectively said second, predetermined access criterion, in that each of said comparing means (CMLIM0BP/CMLIMmBP) is further adapted to receive from said access request interface (UAABP) said at least one corresponding bit of said first, respectively said second, access request word (ARWBP: ARWBP'), and to compare these respectively with said at least one bit of said first, respectively said second, own priority word, received from said extraction means, and to generate therefrom, and from said third control signal, in accordance with a first, respectively a second predetermined bit comparison criterion related to said first, respectively said second, predetermined comparison criterion, the value of said first control signal (C1LIM0BP/ C1LIMmBP) to said data buffer (DATALIM0BP/ DATALIMmBP) included in each of said units, and the value of said second control signal (C2LIM0BP/ C2LIMmBP) to said extraction means (EXLIM0BP/ EXLIMmBP), and in that each of said enabling units (DAB0, DAB1, ..., DABn-1, DABn) is further adapted to receive from said associated access request interface (UAABP0, UAABP1, ..., UAABPn-1, UAABPn) at least one corresponding bit of said first plurality access request word (ARWBP0, ARWBP1, ..., ARWBPn-1, ARWBPn) related to said corresponding plurality (P0, P1, ..., Pn-1, Pn), and from said preceding enabling unit at least one corresponding bit of said updated first plurality access request word, for generating at least one corresponding bit of said updated first plurality access request word related to said corresponding plurality (ARWBP0", ARWBP1", ..., ARWBPn-1", ARWBPn-1) and said local control signal (LHP0, LHP1, ..., LHPn-1, LHPn).

* * * * *

UNITED STATES PATENT AND TRADEMARK OFFICE
CERTIFICATE OF CORRECTION

PATENT NO : 6,105,084
DATED : August 15, 2000
INVENTOR(S): P. Dobbelaere, G. Van Wonterghem It is certified that error appears in the above-identified patent and that said Letters Patent are hereby corrected as shown below:

At column 21, line 20, delete "adopted" and substitute --adapted--.

At column 22, line 46, delete "PWOBPZPWmBP')" and substitute --PWOBP/PWmBP')--.

At column 24, line 14, delete "ARWBPn-1)" and substitute --ARWBPn"--.

Signed and Sealed this

Twenty-fourth Day of April, 2001

Attest:

NICHOLAS P. GODICI

Attesting Officer

Acting Director of the United States Patent and Trademark Office